(12) United States Patent
Cerundolo et al.

(10) Patent No.: US 11,833,923 B2
(45) Date of Patent: Dec. 5, 2023

(54) WHEEL MOVEMENT TRIGGER FOR BATTERY WAKE-UP SYSTEMS AND METHODS

(71) Applicant: Lyft, Inc., San Francisco, CA (US)

(72) Inventors: Jason Cerundolo, San Francisco, CA (US); Gary Shambat, San Francisco, CA (US); Alison Thurber, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 784 days.

(21) Appl. No.: 16/791,120

(22) Filed: Feb. 14, 2020

(65) Prior Publication Data
US 2021/0252994 A1   Aug. 19, 2021

(51) Int. Cl.
*B60L 58/10*   (2019.01)
*B60W 10/26*   (2006.01)
*B60L 50/60*   (2019.01)
*B60W 10/08*   (2006.01)

(52) U.S. Cl.
CPC ............. *B60L 58/10* (2019.02); *B60L 50/60* (2019.02); *B60W 10/08* (2013.01); *B60W 10/26* (2013.01); *B60L 2200/12* (2013.01); *B60L 2240/54* (2013.01)

(58) Field of Classification Search
CPC ...... B60L 58/10; B60L 50/60; B60L 2200/12; B60L 2240/54; B60W 10/08; B60W 10/26
USPC .......................................................... 701/22
See application file for complete search history.

(56) References Cited

U.S. PATENT DOCUMENTS

| | | | |
|---|---|---|---|
| 2014/0002060 A1* | 1/2014 | Mizutani | B62J 45/423 |
| | | | 324/163 |
| 2020/0207216 A1* | 7/2020 | Hasumi | B62M 9/04 |
| 2021/0023952 A1* | 1/2021 | Sussna | B60L 15/2045 |

* cited by examiner

*Primary Examiner* — Yi-Kai Wang
(74) *Attorney, Agent, or Firm* — Baker Botts L.L.P.

(57) ABSTRACT

A micromobility transit vehicle may include a wheel, a dynamo, a control module, and a battery. The dynamo may be associated with the wheel and configured to transmit a first signal based at least on a detection of one or more movements of the wheel that meets or exceeds a threshold movement of the wheel. The control module may be configured to receive the first signal transmitted by the dynamo. The control module may be configured to transmit a second signal upon receiving the first signal from the dynamo. The battery may be configured to receive the second signal transmitted by the control module. The second signal may cause the battery to wake from a battery-off state to a battery-on state.

20 Claims, 10 Drawing Sheets

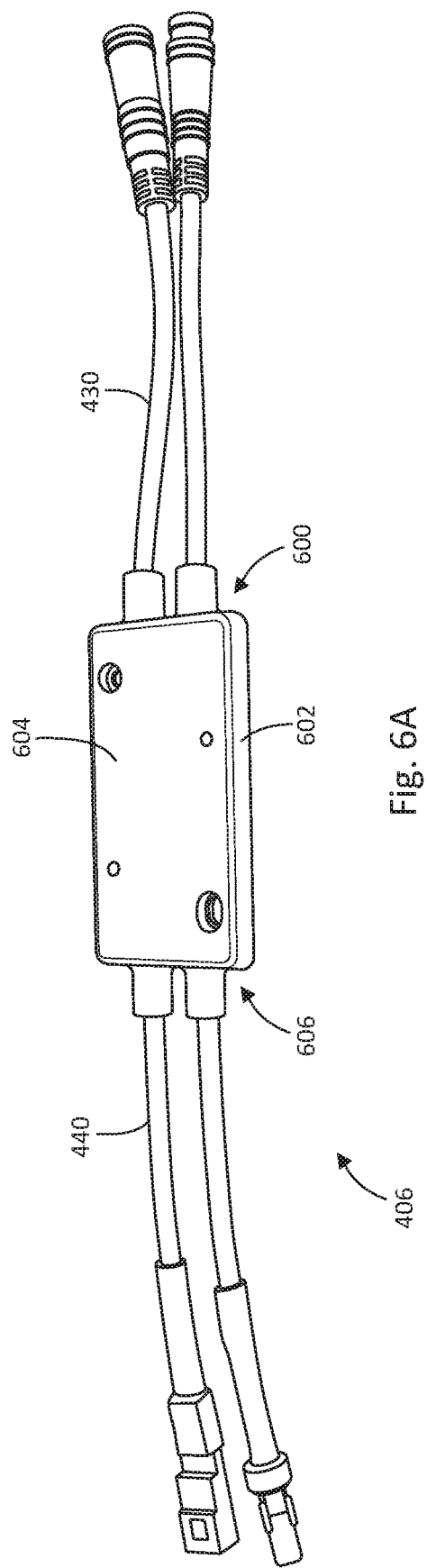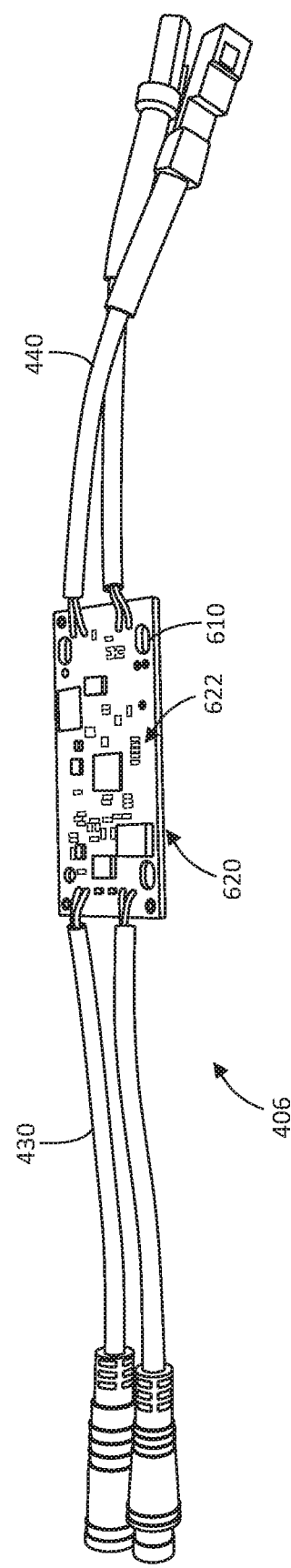
Fig. 6A
Fig. 6B

WHEEL MOVEMENT TRIGGER FOR BATTERY WAKE-UP SYSTEMS AND METHODS

TECHNICAL FIELD

One or more embodiments of the present disclosure relate generally to micromobility transit vehicles and more particularly, for example, to systems and methods for waking a battery of a micromobility transit vehicle based on detected wheel movement.

BACKGROUND

It can be difficult and/or confusing for a user to power and/or wake-up a shared micromobility vehicle (e.g., a shared scooter, sit-scooter, bicycle, etc.). For example, some designs require the user to manually press an activation (power) button and/or perform a sequence of events, which can be difficult to locate or understand, thereby creating an awkward experience for the user. Some users naturally attempt to push, pull, or otherwise move the shared vehicle without first powering and/or waking up the vehicle. Such can be difficult, especially if the shared vehicle is immobilized. Moving the shared vehicle may also not provide any indication to the user that the vehicle is powered on or otherwise ready to ride. This often leads to the user leaving the shared vehicle, assuming the vehicle is non-operable. In addition, many legacy transportation systems can benefit from technological improvements addressing such deficiencies without taking the legacy transportation systems out of service. For example, technological improvements addressing such deficiencies may need to be implemented quickly and efficiently to numerous legacy transportation systems that have a manual wake-up signal structure or system.

Therefore, there is a need in the art for systems and methods for a micromobility vehicle that addresses the deficiencies noted above, other deficiencies known in the industry, or at least offers an alternative to current techniques. In addition, there is a need for advancements in technology being implemented on legacy transportation systems to address the deficiencies noted above.

SUMMARY

Techniques are disclosed for systems and methods associated with waking a battery of a micromobility transit vehicle based on detected wheel movement. In accordance with one or more embodiments, a micromobility transit vehicle may include a wheel, a dynamo, a control module, and a battery. The dynamo may be associated with the wheel and configured to transmit a first signal based at least on a detection of one or more movements of the wheel that meets or exceeds a threshold movement of the wheel. The control module may be configured to receive the first signal transmitted by the dynamo. The control module may be configured to transmit a second signal upon receiving the first signal from the dynamo. The battery may be configured to receive the second signal transmitted by the control module. The second signal may cause the battery to wake from a battery-off state.

In accordance with one or more embodiments, a multimodal transportation system may include one or more micromobility transit vehicles. Each of the one or more micromobility transit vehicles may include an electric battery configured to receive a manual signal that wakes the electric battery from a battery-off state to a battery-on state, a dynamo configured to detect one or more wheel movements that meets or exceeds a threshold movement and transmit a dynamo signal, and a control module coupled to the dynamo. The control module may be configured to receive the dynamo signal from the dynamo and wake the electric battery from the battery-off state to the battery-on state without the electric battery receiving the manual signal. The dynamo may be configured to transmit the dynamo signal to a communication bus of the micromobility transit vehicle, and the control module may be configured to receive the dynamo signal over the communication bus.

In accordance with one or more embodiments, a control module for a micromobility transit vehicle may be configured to wake an electric battery of the micromobility transit vehicle from a battery-off state to a battery-on state based on one or more sensed dynamic characteristics of the micromobility transit vehicle that meet or exceed a threshold. The control module may include a first controller configured to receive a first signal based on the one or more sensed dynamic characteristics of the micromobility transit vehicle that meet or exceed the threshold. The control module may include a second controller configured to transmit a second signal to the electric battery based at least on a receipt of the first signal by the first controller. The second signal may cause the electric battery to change from the battery-off state to the battery-on state.

In accordance with one or more embodiments, a system for a micromobility transit vehicle may include a non-transitory medium storing instructions and one or more hardware processors operable to execute the instructions to cause the system to perform operations. The operations may include detecting a movement of a wheel; determining whether the movement meets or exceeds a threshold movement; based on determining the movement meets or exceeds the threshold movement, transmitting a signal to a battery of the micromobility transit vehicle; and based on receiving the signal, causing the battery to wake from a battery-off state to a battery-on state.

In accordance with one or more embodiments, a method may include detecting a movement of a wheel of a micromobility transit vehicle, determining the movement meets or exceeds a threshold movement, transmitting a signal to a battery of the micromobility transit vehicle, and in response to receiving the signal, causing the battery to wake from a battery-off state and provide power to the micromobility transit vehicle.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 6A illustrates a perspective view of a control module in accordance with an embodiment of the disclosure.

FIG. 6B illustrates a perspective view of the control module of FIG. 6A with a housing removed for illustrations purposes in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, micromobility transit vehicles (e.g., kick scooters, sit-scooters, bicycles, etc.) benefit from a battery wake-up feature triggered by wheel movement. The battery wake-up feature may be implemented using one or more elements, controllers, hardware processors, or the like that perform operations including detecting a movement of a wheel, determining whether the movement meets or exceeds a threshold movement, based on determining the movement exceeds the threshold movement, transmitting a signal to a battery of the micromobility transit vehicle, and based on receiving the signal, causing the battery to wake from a battery-off state and provide power to the micromobility transit vehicle.

The micromobility transit vehicle may include a wheel and a dynamo (or other electrical power generator) associated with the wheel and configured to transmit a first signal upon a detection of a threshold movement of the wheel. The micromobility transit vehicle may include a control module communicatively coupled to the dynamo to receive the first signal transmitted by the dynamo (e.g., over a communication bus). The control module may be configured to transmit a second signal upon receiving the first signal from the dynamo. The micromobility transit vehicle may include a battery communicatively coupled to the control module to receive the second signal transmitted by the control module. Receipt of the second signal by the battery causes the battery to wake from a battery-off state and provide power to the micromobility transit vehicle.

Figure 1:
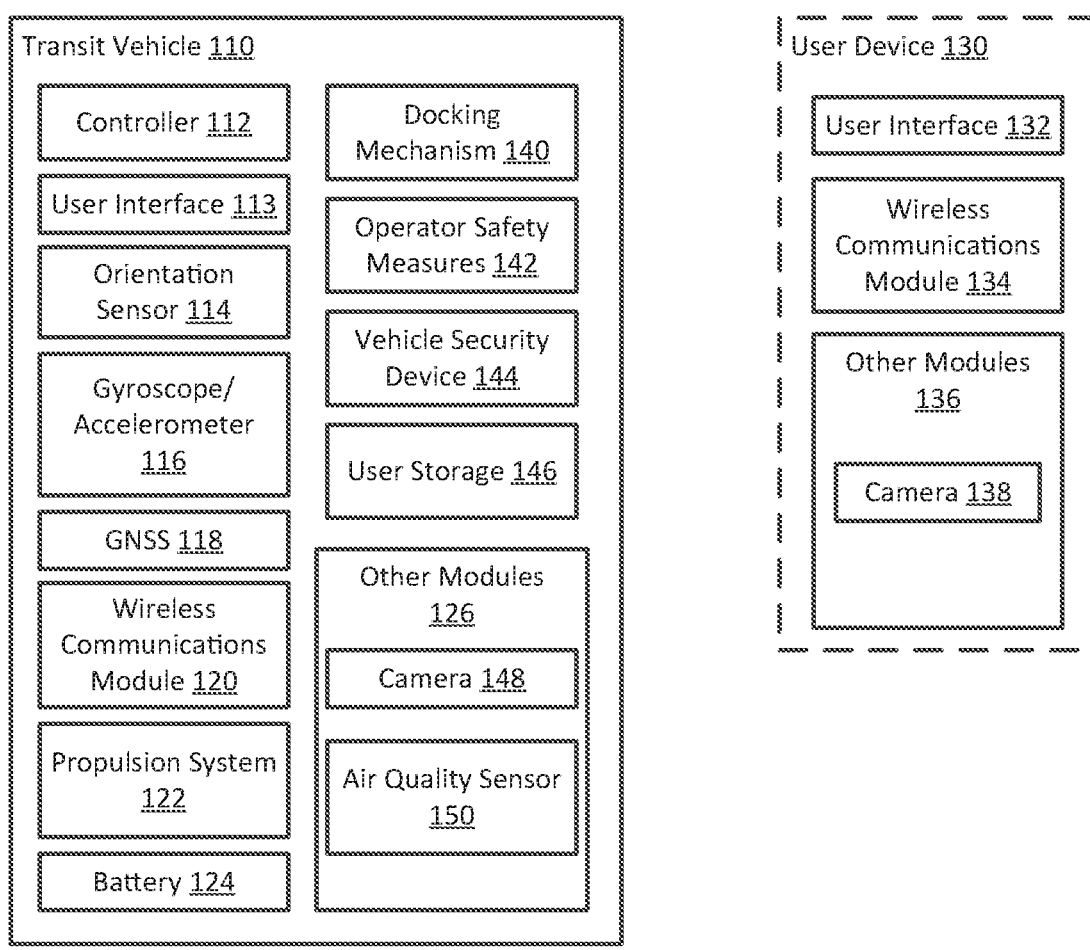
FIG. 1 illustrates a block diagram of a portion of a dynamic transportation matching system including a transit vehicle in accordance with an embodiment of the disclosure.

FIG. 1 illustrates a block diagram of a portion of a dynamic transportation matching system (e.g., system 100) including a transit vehicle 110 in accordance with an embodiment of the disclosure. In the embodiment shown in FIG. 1, system 100 includes transit vehicle 110 and optional user device 130. In general, transit vehicle 110 may be a passenger vehicle designed to transport a single user (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. Optional user device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of transit vehicle 110 may be substantially manual, autonomous, and/or partially or completely controlled by optional user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 123 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of transit vehicle 110 and/or system 100. In further embodiments, other modules 126 may include a light, such as a headlight or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and user and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
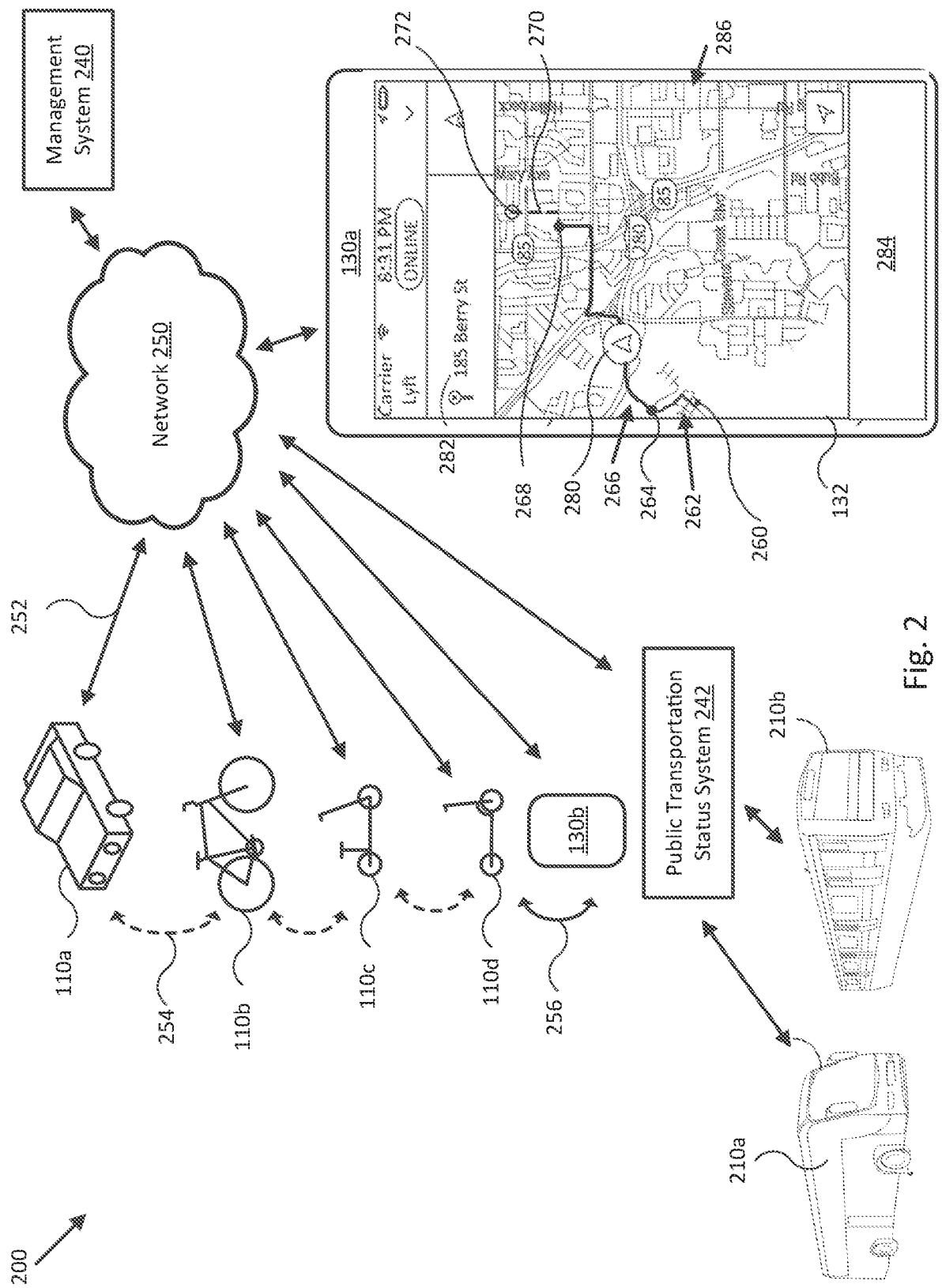
FIG. 2 illustrates a block diagram of a dynamic transportation matching system incorporating a variety of transportation modalities in accordance with an embodiment of the disclosure.

FIG. 2 illustrates a block diagram of dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, a requestor may use user device 130a to hire or rent one of transit vehicles 110a-d by transmitting a transportation request to management system 240 over WAN 250, allowing management system 240 to poll status of transit vehicles 110a-d and to select one of transit vehicles 110a-d to fulfill the transportation request; receiving a fulfillment notice from management system 240 and/or from the selected transit vehicle, and receiving navigation instructions to proceed to or otherwise meet with the selected transit vehicle. A similar process may be used by a requestor using user device 130b, but where the requestor is able to enable a transit vehicle over local communication link 263, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a user attempting to travel from origination point 260 to destination 272 using different transportation modalities (e.g., a planned multimodal route), as depicted in route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such planned multimodal route may include, for example, walking route 262 from origination point 260 to bus stop 264, bus route 266 from bus stop 264 to bus stop 268, and micromobility route 270 (e.g., using one of micromobility transit vehicles 110b, 110c, or 110d) from bus stop 268 to destination 272. Also shown rendered by user interface 132 are present location indicator 280 (indicating a present absolute position of user device 130a on street map 486), navigation destination selector/indicator 282 (e.g., configured to allow a user to input a desired navigation destination), and notice window 284 (e.g., used to render fleet status data, including user notices and/or alerts, as described herein). For example, a user may use navigation destination selector/indicator 282 to provide and/or change destination 272, as well as change any leg or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a user (e.g., initially and/or while traversing a particular planned route), and a user may select or make changes to such route through manipulation of user device 130a, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share transit vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
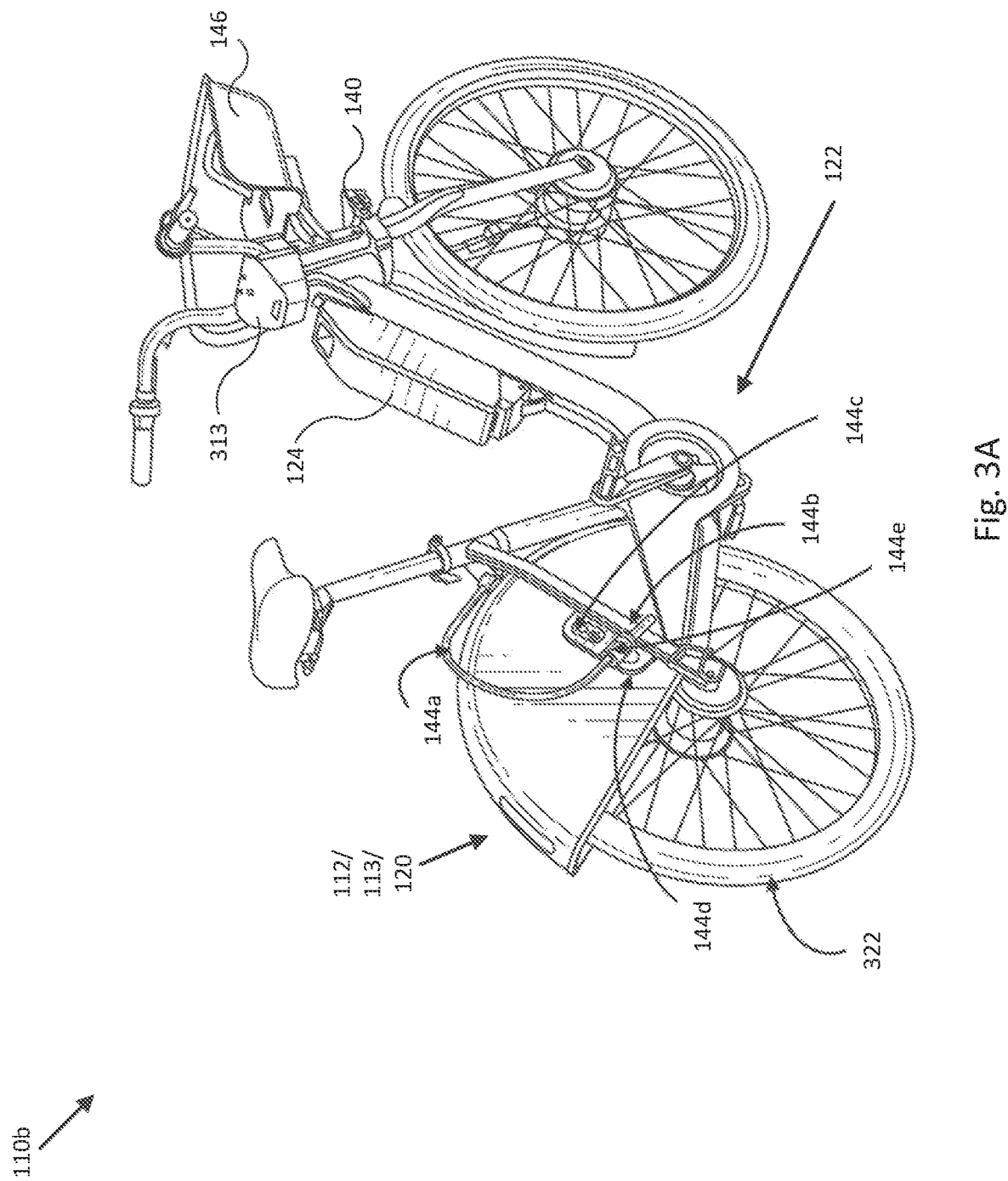
FIGS. 3A-C illustrate diagrams of micromobility transit vehicles for use in a dynamic transportation matching system in accordance with an embodiment of the disclosure.
Figure 3B:
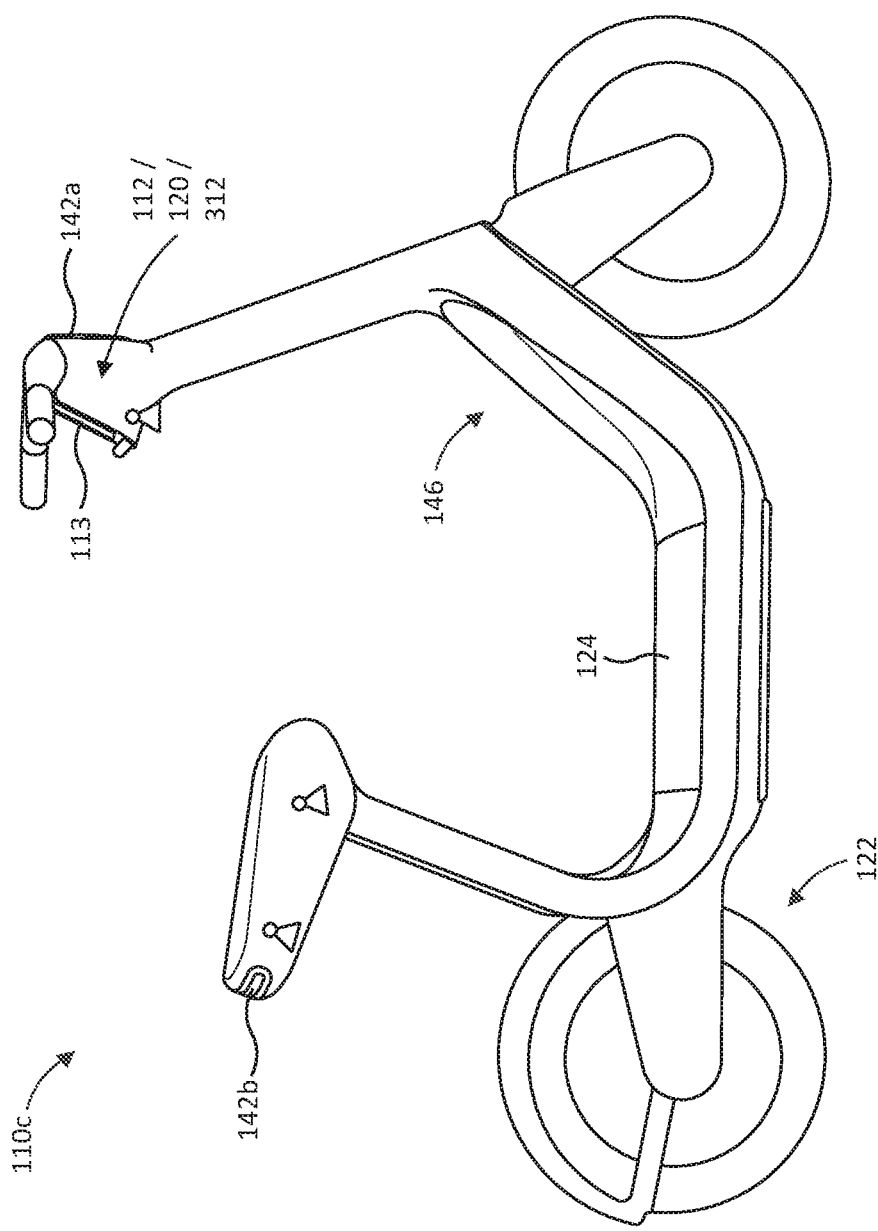
Figure 3C:
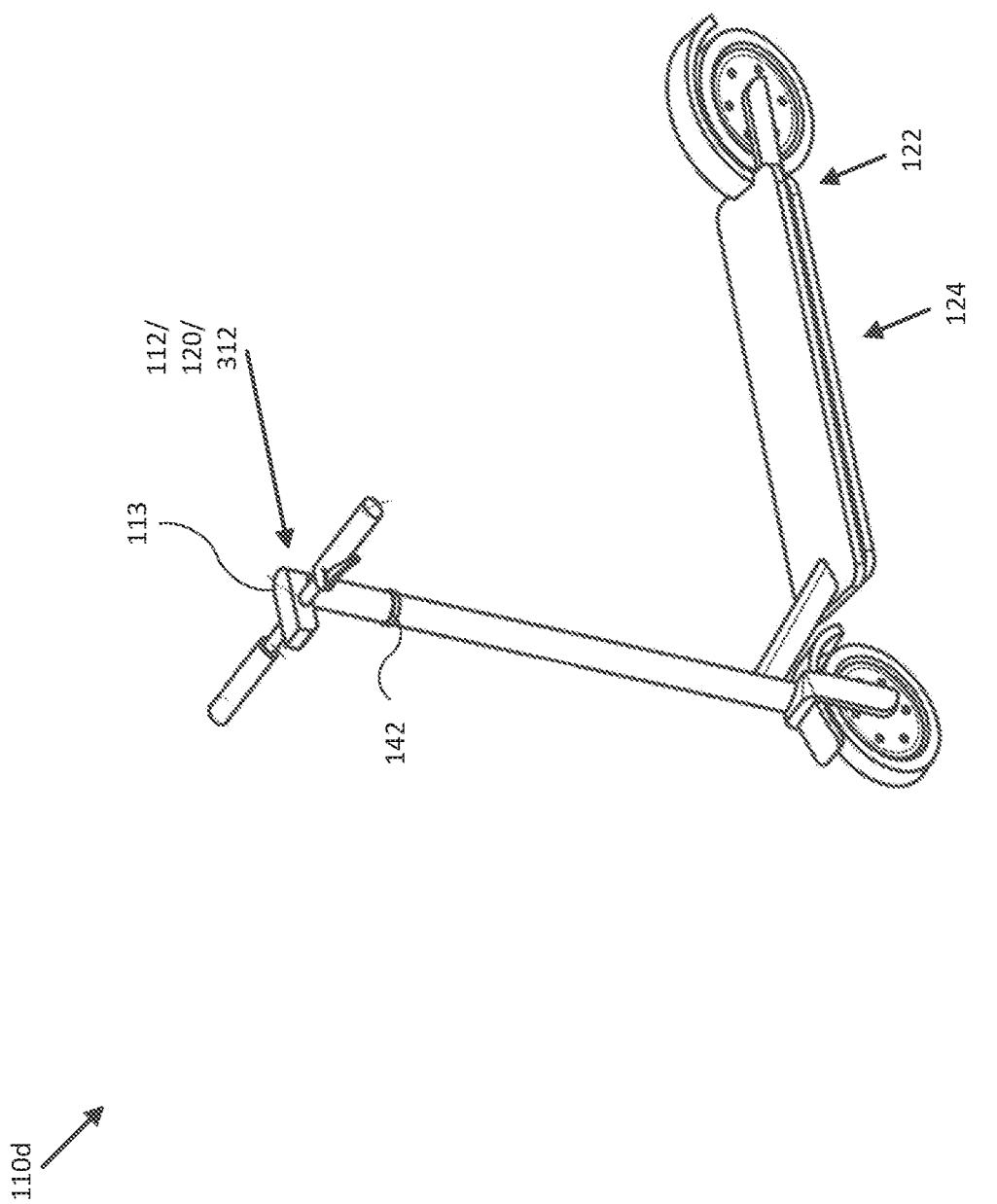

FIGS. 3A-C illustrate diagrams of micromobility transit vehicles 110b, 110c, and 110d, which may be integrated with mobile mesh network provisioning systems in accordance with an embodiment of the disclosure. For example, transit vehicle 110b of FIG. 3A may correspond to a motorized bicycle for hire that is integrated with the various elements of system 100 and may be configured to participate in dynamic transportation matching system 200 of FIG. 2. As shown, transit vehicle 110b includes controller/user interface/wireless communications module 112/113/120 (e.g., integrated with a rear fender of transit vehicle 110b), propulsion system 122 configured to provide motive power to at least one of the wheels (e.g., a rear wheel 322) of transit vehicle 110b, battery 124 for powering propulsion system 122 and/or other elements of transit vehicle 110b, docking mechanism 140 (e.g., a spade lock assembly) for docking transit vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilizing rear wheel 322 of transit vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize transit vehicle 110b by default, thereby requiring a user to transmit a hire request to management system 240 (e.g., via user device 130) to hire transit vehicle 110b before attempting to use transit vehicle 110b. The hire request may identify transit vehicle 110b based on an identifier (e.g., a QR code, a barcode, a serial number, etc.) presented on transit vehicle 110b (e.g., such as by user interface 113 on a rear fender of transit vehicle 110b). Once the hire request is approved (e.g., payment is processed), management system 240 may transmit an unlock signal to transit vehicle 110b (e.g., via network 250). Upon receiving the unlock signal, transit vehicle 110b (e.g., controller 112 of transit vehicle 110b) may release vehicle security device 144 and unlock rear wheel 322 of transit vehicle 110b.

Transit vehicle 110c of FIG. 3B may correspond to a motorized sit-scooter for hire that is integrated with the various elements of system 100 and may be configured to participate in dynamic transportation matching system 200 of FIG. 2. As shown in FIG. 3B, transit vehicle 110c includes many of the same elements as those discussed with respect to transit vehicle 110b of FIG. 3A. For example, transit vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlights, programmable light strips, and/or reflective strips.

Transit vehicle 110d of FIG. 3C may correspond to a motorized stand or kick scooter for hire that is integrated with the various elements of system 100 and may be configured to participate in dynamic transportation matching system 200 of FIG. 2. As shown in FIG. 3C, transit vehicle 110d includes many of the same elements as those discussed with respect to transit vehicle 110b of FIG. 3A. For example, transit vehicle 110d may include user interface 113, propulsion system 122, battery 124, controller/wireless communications module/cockpit enclosure 112/120/312, and operator safety measures 140, which may be implemented as various types programmable light strips and/or reflective strips, as shown.

Figure 3D:
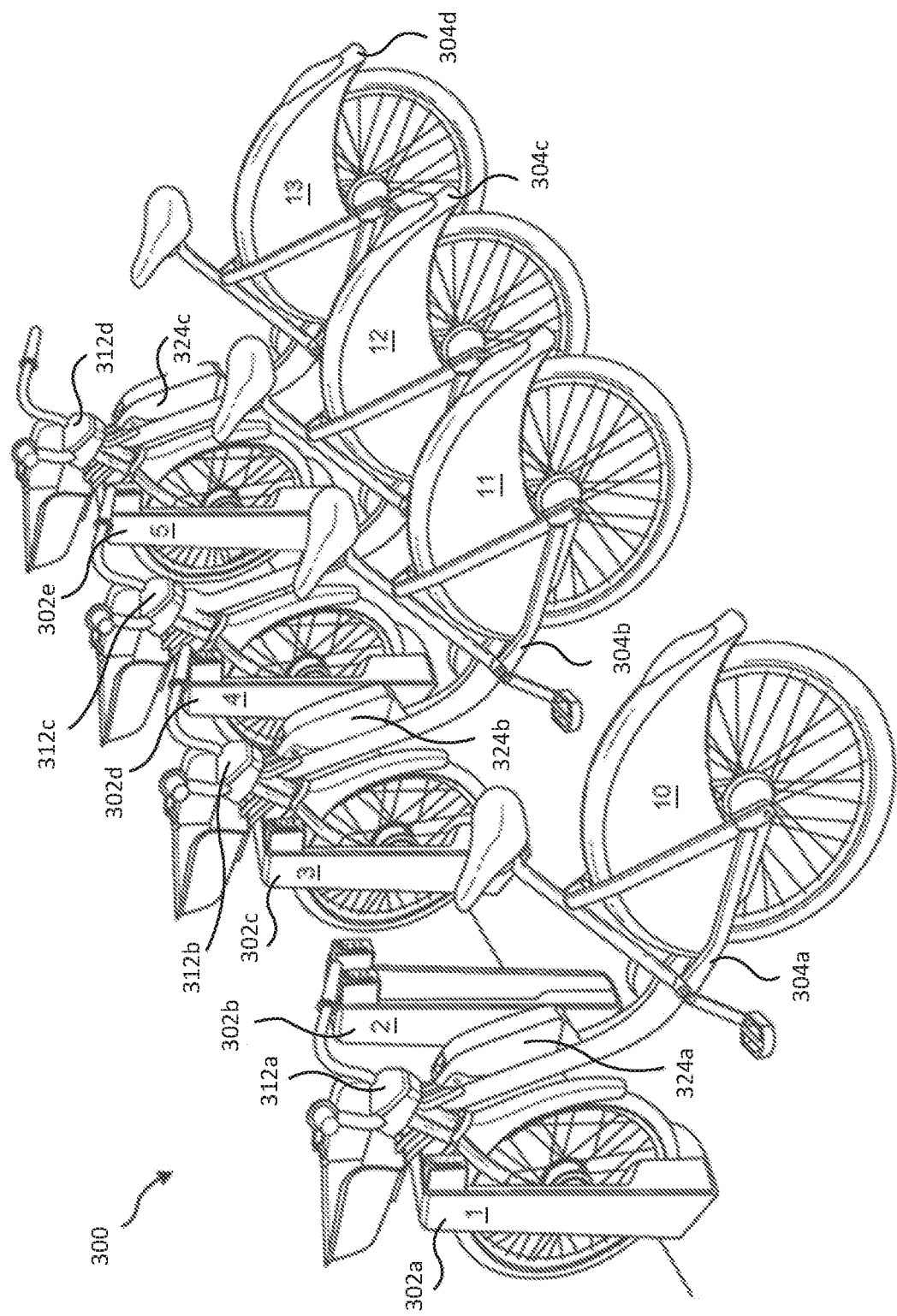
FIG. 3D illustrates a diagram of a docking station for docking micromobility transit vehicles in accordance with an embodiment of the disclosure.

FIG. 3D illustrates a docking station 300 for docking transit vehicles (e.g., transit vehicles 110c, 110e, and 110g, etc.) according to one embodiment. As shown, docking station 300 may include multiple bicycle docks, such as docks 302a-e. In this example, a single transit vehicle (e.g., any one of electric bicycles 304a-d) may dock in each of the docks 302a-e of the docking station 300. Each of the docks 302a-e may include a lock mechanism for receiving and locking docking mechanism 140 of the electric bicycles 304a-d. In some embodiments, once a transit vehicle is docked in a bicycle dock, the dock may be electronically coupled to the transit vehicle (e.g., controllers 312a-d of the transit vehicle) via a link such that the transit vehicle and the dock may communicate with each other via the link.

A user may use a user device (e.g., user device 130) to hire a transit vehicle that is docked in one of the bicycle docks 302a-e by transmitting a hire request to management system 240. Once the hire request is processed, management system 240 may transmit an unlock signal to the electric bicycle docked in the dock and/or the dock via network 250. The dock may automatically unlock the lock mechanism to release the electric bicycle based on the unlock signal. In some embodiments, each of the docks 302a-e may also be configured to charge batteries (e.g., batteries 324a-c) of the electric bicycle 304a-d, respectively, when the electric bicycle 304a-d are docked at the docks 302a-e. In some embodiments, docking station 300 may also be configured to transmit information associated with the docking station 300 (e.g., a number of transit vehicles docked at the docking station 300, charge statuses of the docked transit vehicles, etc.) to the management system 240.

Figure 4:
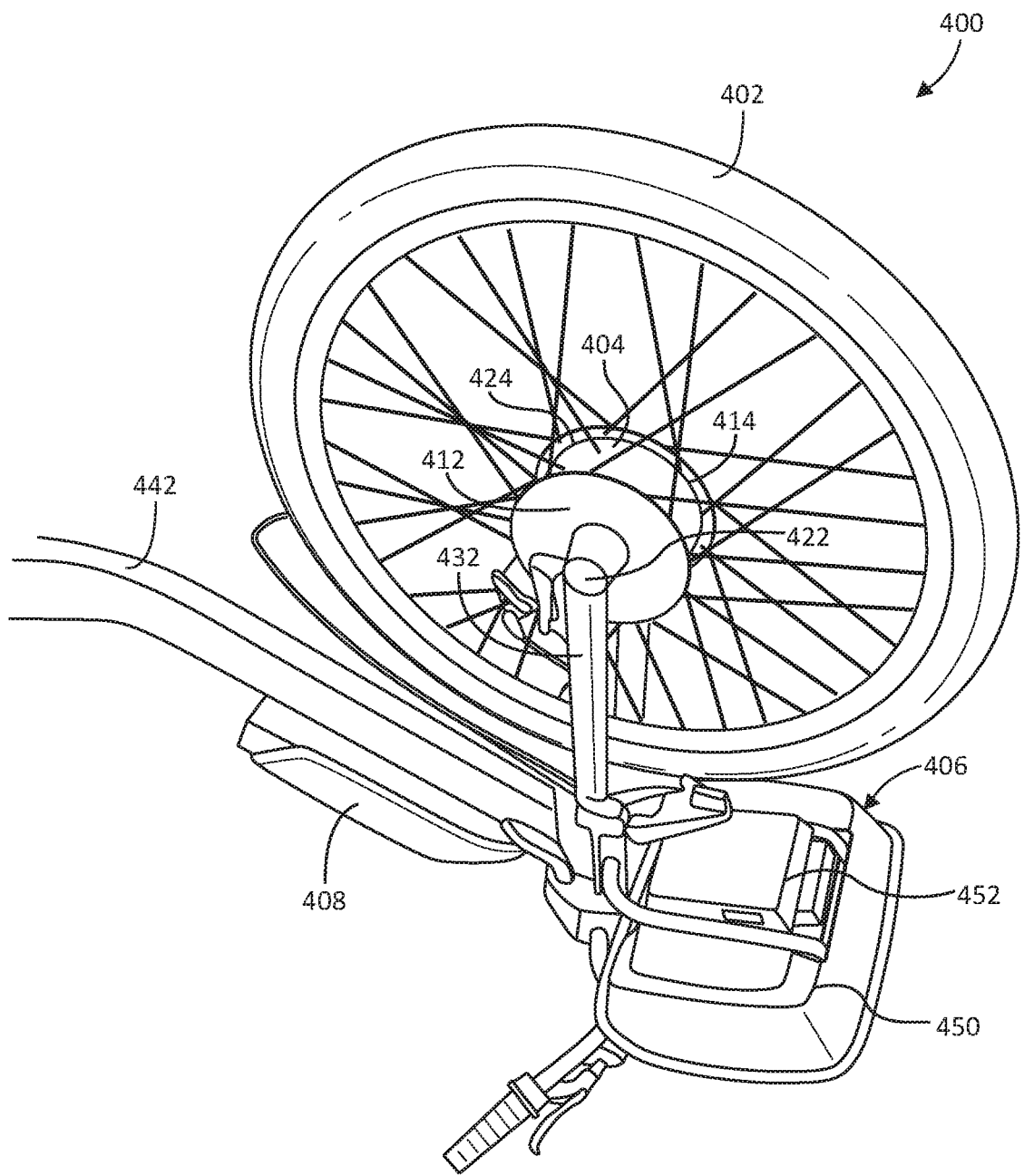
FIG. 4 illustrates a fragmentary, bottom perspective view of a micromobility transit vehicle in accordance with an embodiment of the disclosure.

FIG. 4 illustrates a fragmentary, bottom perspective view of a micromobility transit vehicle 400 in accordance with an embodiment of the disclosure. As described herein, the micromobility transit vehicle 400 includes a movement-based wake feature. For example, movement of the micromobility transit vehicle 400, or portions thereof, powers a wake-up function or module to wake the micromobility transit vehicle 400 from a first state, such as a sleep mode, a powered down mode, a protection mode, and/or a locked mode, among others. In such embodiments, the micromobility transit vehicle 400 includes one or more components that convert mechanical energy (e.g., kinetic energy) into electrical energy to power the wake-up function/module. In such embodiments, user-actuated movement of the one or more components will generate the electrical energy needed to power the wake-up function/module of the micromobility transit vehicle 400, as described more fully below.

Referring to FIG. 4, the micromobility transit vehicle 400 may include many configurations, such as being similar to any one of the micromobility transit vehicles 110, 110a-d, described above. In the embodiment shown in FIG. 4, the micromobility transit vehicle 400 includes a wheel 402, a dynamo 404 associated with the wheel 402, a control module 406, and a battery 408, although such a configuration is illustrative only. For example, the micromobility transit vehicle 400 may not include the battery 408, in which case the micromobility transit vehicle 400 simply includes the wheel 402, the dynamo 404, and the control module 406. The wheel 402 may be a drive wheel or a driven wheel of the micromobility transit vehicle 400. Similarly, the wheel 402 may be a front wheel or a rear wheel of the micromobility transit vehicle 400. For ease of reference, however, the wheel 402 is shown and described below as the front, driven wheel of the micromobility transit vehicle 400. Depending on the application, the wheel 402 may be defined by a hub, a rim, a tire, and a plurality of spokes connecting the rim to the hub. In some embodiments, the wheel 402 may be defined simply as the rim or any other sub-component or sub-assembly of the hub, rim, tire, and spokes.

The dynamo 404 may be any electrical power generator configured to convert mechanical (e.g., kinetic) energy of the wheel 402 into electrical energy or power. For instance, the dynamo 404 may be a generator, a magneto, an alternator, an electrical power generator, or the like. The dynamo 404 may be coupled to the wheel 402 such that rotation of the wheel 402 causes rotation of at least a portion of the dynamo 404, such as corresponding rotation, a geared reduction rotation, or a geared overdrive rotation. In some embodiments, the dynamo 404 may utilize rotating coils of wire and one or more magnetic fields to convert mechanical rotation of the wheel 402 into electric current through Faraday's law of induction and Lenz's law. For example, the dynamo 404 may include a first portion 412 and a second portion 414. The first portion 412, which may be referred to as a stator and may be a stationary portion, may produce a magnetic field through permanent magnets, electromagnets, and/or field coils. The second portion 414, which may be referred to as an armature and may be a movable portion, may include one or more sets of windings that rotate within the magnetic field produced by the first portion 412. Due to Faraday's law of induction, the motion of the windings within the magnetic field creates an electric current in the windings. Depending on the application, the dynamo 404 may produce direct current (DC) or the dynamo 404 may produce alternating current (AC). Thus, the dynamo 404 described herein is not limited to configurations typically associated with DC electrical generators (as associated with the term "dynamo") but also includes configurations typically associated with AC electrical generators (as associated with the term "magneto" or "alternator"). Accordingly, the dynamo 404 is limited only by the embodiments described herein and encompasses any electrical power generator configured to convert mechanical or kinetic energy of the wheel 402 into electrical energy or power. In addition, the dynamo 404 may be associated with other components of the micromobility transit vehicle 400 that rotate during operation. For instance, the dynamo 404 may be associated with one or more pedals of the micromobility transit vehicle 400, such that rotation of the one or more pedals creates electrical energy or power within the dynamo 404.

Depending on the application, the first portion 412 of the dynamo 404 may be coupled to or define a first portion of the micromobility transit vehicle 400, and the second portion 414 of the dynamo 404 may be coupled to or define a second portion of the micromobility transit vehicle 400. For instance, the first portion 412 of the dynamo 404 may be coupled to or define a stationary portion of the micromobility transit vehicle 400. Similarly, the second portion 414 of the dynamo 404 may be couple to or define at least a portion of a movable portion of the micromobility transit vehicle 400. For example, the first portion 412 of the dynamo 404 may be coupled to or define an axle 422 of the micromobility transit vehicle 400. In such embodiments, the second portion 414 of the dynamo 404 may be coupled to or define at least a portion of a hub 424 of the wheel 402 that rotates about the first portion 412 of the dynamo 404. In this manner, the dynamo 404 may be integrated into the hub 424 of the wheel 402 such that the dynamo 404 is part of the wheel 402, in which case the dynamo 404 may be referred to as a hub dynamo. In some embodiments, the dynamo 404 may be coupled to the wheel 404. For instance, the dynamo 404 may be secured to the micromobility transit vehicle 400 such that the dynamo 404 is activated by rotation of the wheel 404. For example, the dynamo 404 may be positioned at least partially in contact with the rim or hub of the wheel 404 such that movement of the rim or hub rotates the dynamo 404.

The control module 406 may include many configurations operable to control one or more operations of the micromobility transit vehicle 400 based upon a sensed condition or characteristic of the dynamo 404. For instance, as described herein, the control module 406 may be configured to transmit a control signal to the battery 408 upon receiving a signal from the dynamo 404. For instance, the control module 406 may be configured to transmit a control signal to the battery 408 upon sensing power from the dynamo 404. In this manner, the control module 406 may be placed or positioned between the dynamo 404 and the battery 408 of the micromobility transit vehicle 400. In such embodiments, the control module 406 may be considered a battery control module. In some embodiments, the control module 406 may be configured to transmit a control signal to a user interface, such as user interface 113 of FIG. 1, described above.

Depending on the application, the control module 406 may be connected to the dynamo 404 through one or more dynamo cables 430 routed from the dynamo 404 to the control module 406. For instance, the dynamo cables 430 may be routed through a front fork 432 of the micromobility transit vehicle 400 from the dynamo 404 to the control module 406. Similarly, the control module 406 may be connected to the battery 408 through one or more control cables 440 routed from the battery 408 to the control module 406. For instance, the control cables 440 may be routed through a portion of a frame 442 of the micromobility transit vehicle 400 from the battery 408 to the control module 406.

As shown in FIG. 4, the micromobility transit vehicle 400 may include a storage basket 450. The storage basket 450 may be similar to the user storage 146 described above. For instance, the storage basket 450 may be mounted to the micromobility transit vehicle 400 above the wheel 402. Depending on the application, the storage basket 450 may be mounted to the front of the micromobility transit vehicle 400 above the front wheel, such as that shown in FIGS. 3A and 4. The control module 406 may be located underneath the storage basket 450. For instance, the storage basket 450 may include an enclosure 452 positioned beneath the storage basket 450. The enclosure 452 may be sealed, positioned, and/or designed to limit ingress of dirt, fluid, and other debris. In such embodiments, the control module 406 may be located at least partially within the enclosure 452 to shield and/or protect the control module 406 from the elements and/or tampering. In such embodiments, the dynamo cables 430 may be routed from the dynamo 404 to within the enclosure 452 for connection with the control module 406. Similarly, the control cables 440 may be routed from the battery 408 to within the enclosure 452 for connection with the control module 406.

The battery 408 may include many configurations configured to provide electrical power to the micromobility transit vehicle 400. For instance, the battery 408 may be implemented as one or more cells (e.g., lithium ion battery cells) configured to provide electrical power to a propulsion system to propel micromobility transit vehicle 400. The battery 408 may be similar to battery 124 of FIGS. 1-3C, described above.

Figure 5:
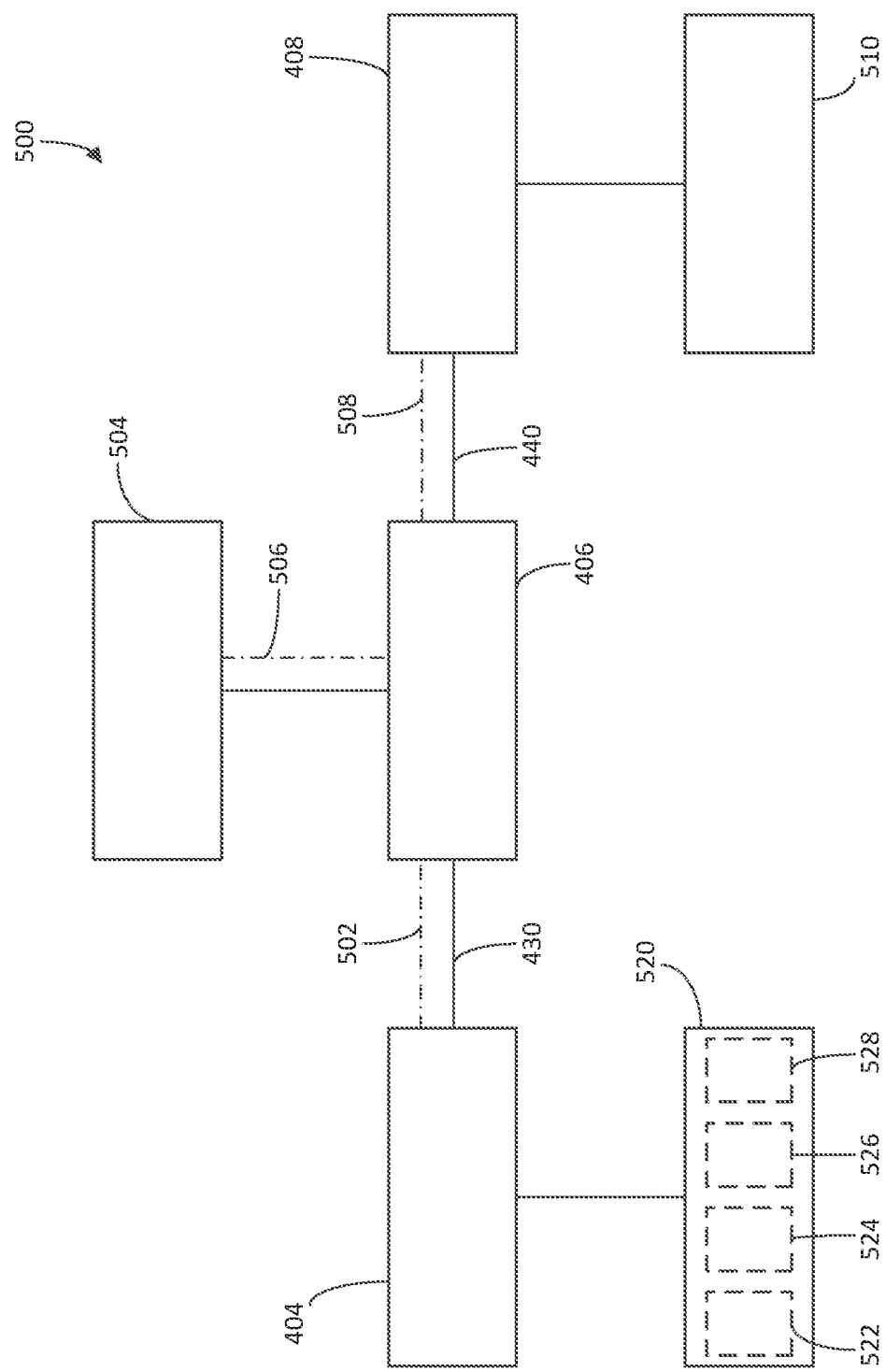
FIG. 5 illustrates a schematic representation of a battery wake-up system for a micromobility transit vehicle in accordance with an embodiment of the disclosure.

FIG. 5 illustrates a schematic representation of a system 500 for micromobility transit vehicle 400 in accordance with an embodiment of the disclosure. The system 500 may be a battery activation or wake-up system operable to activate or wake the battery 408 from a battery-off state based on one or more dynamic characteristics of the micromobility transit vehicle 400, such as movement of the wheel 402 (e.g., beyond a threshold movement), as described below. In some embodiments, the system 500 may activate or wake the battery 408 from a battery-off state to a battery-on state. Depending on the application, the battery 408 may be configured to receive a manual signal that wakes the battery 408 from the battery-off state. For example, manual actuation of a power button by a user or operator may cause the battery 408 from the battery-off state. As described herein, the system 500 may be configured to wake the battery 408 from the battery-off state without the manual signal. For instance, based at least on one or more wheel movements of the micromobility transit vehicle 400, the system 500 may automatically wake the battery 408 from the battery-off state, as detailed below.

Depending on the application, the battery-off state may be a sleep mode of the battery 408, a powered down or standby mode of the battery 408, a protection mode of the battery 408, and/or a locked mode of the battery 408. For example, after a period of inactivity, the battery 408 may enter a sleep mode, which may be a low-power mode of the battery 408 to conserve battery power. After an extended period of inactivity, or as directed by an operator of the micromobility transit vehicle 400 (e.g., locally by a rider or a service technician, remotely by a fleet manager, etc.), the battery 408 may enter a powered down or standby mode, which may be a no-power mode of the battery 408 to further conserve battery power. Upon a detection of threat to the micromobility transit vehicle 400 or to one or more components thereof (e.g., to the battery 408), the battery 408 may enter a protection mode and/or a locked mode to protect against the detected threat. Although the battery-off state may be any number of low or no-power states of the battery 408, the battery-off state may simply be referred to as a sleep mode. In this manner, "sleep mode" may refer to any number and/or type of battery-off states in which power discharge from the battery 408 is limited. The battery-on state may be any battery mode that permits the battery 408 to provide power to the micromobility transit vehicle 400 (e.g., an active mode).

In some embodiments, the system 500 may be operable to activate or wake other portions of the micromobility transit vehicle 400, such as user interface 113, based on the same one or more dynamic characteristics of the micromobility transit vehicle 400, such as movement of the wheel 402 (e.g., beyond a threshold movement). In such embodiments, the user interface 113 (or other portion of the micromobility transit vehicle 400 associated with the control module 406) may include similar off states as described above, such as a sleep mode of the user interface 113, a powered down or standby mode of the user interface 113, a protection mode of the user interface 113, and/or a locked mode of the user interface 113.

As shown in FIG. 5, the system 500 includes the dynamo 404, the control module 406 communicatively coupled to the dynamo 404, and the battery 408 communicatively coupled to the control module 406. As described herein, "communicatively coupled" means electrically coupled (e.g., for power coupling), electronically coupled (e.g., for sensor data and/or signal communication), or both electrically coupled and electronically coupled together. Depending on the application, the dynamo 404 and control module 406 may be communicatively coupled through a wired connection (e.g., through dynamo cables 430) and/or through a wireless connection. Similarly, the control module 406 and the battery 408 may be communicatively coupled through a wired connection (e.g., through control cables 440) and/or through a wireless connection.

The dynamo 404 may be configured to transmit a first signal 502 based at least on a detection of one or more movements of the wheel 402 that meets or exceeds a threshold movement. For instance, a user or operator of the micromobility transit vehicle 400 may push, pull, or otherwise move the micromobility transit vehicle 400 across a surface such that the wheel 402 rotates. Once the wheel 402 rotates a predetermined threshold amount, the dynamo 404 may be triggered to transmit the first signal 502, such as to the control module 406. For instance, the dynamo 404 may transmit the first signal 502 via one or more wired or wireless communication protocols. In some embodiments, the first signal 502 may be transmitted to a communication bus located on the micromobility transit vehicle 400. In some embodiments, the first signal 502 may be referred to as a dynamo signal.

The threshold movement may be a rotational degree of the wheel 402 or a distance traveled by the wheel 402. For instance, the threshold movement may be a quarter turn of the wheel 402, between 5° and 15° rotation of the wheel 402, between 15° and 30° rotation of the wheel 402, between 30° and 60° rotation of the wheel 402, between 60° and 90° rotation of the wheel 402, between 90° and 135° rotation of the wheel 402, between 135° and 180° rotation of the wheel 402, between 180° and 270° rotation of the wheel 402, between 270° and 360° rotation or the wheel 402, or greater than 360° rotation of the wheel 402.

In some embodiments, the threshold movement may be based on the distance traveled by the wheel 402, which may provide uniformity across transit vehicles with different wheel sizes. For instance, the threshold movement may be between 3 in. and 6 in traveled by the wheel 402, between, 6 in. and 12 in. traveled by the wheel 402, between 12 in. and 24 in. traveled by the wheel 402, or greater than 24 in. traveled by the wheel 402. Thus, the threshold movement may be the same or similar between a first transit vehicle (e.g., a kick-scooter) with a first diameter wheel (e.g., a smaller diameter wheel) and a second transit vehicle (e.g., a bicycle) with a second diameter wheel (e.g., a larger diameter wheel).

In some embodiments, the threshold movement may be based on a minimum electrical energy generation to transmit the first signal 502. For instance, the threshold movement may be based on the amount of wheel rotation needed for the dynamo 404 to generate the electrical energy needed to transit the first signal 502. Once the requisite electrical energy is generated by the dynamo 404, the dynamo 404 may transmit the first signal 502. In some embodiments, the threshold movement may be based on a minimum electrical energy generation to power the control module 406. For instance, the threshold movement may be a minimum movement requisite to charge one or more capacitors and power the control module 406.

With continued reference to FIG. 5, the control module 406 may be configured to receive the first signal 502 transmitted by the dynamo 404. For example, the control module 406 may be configured to receive the first signal 502 over the communication bus of the micromobility transit vehicle 400. Depending on the application, the first signal 502 may be a first wake-up command causing the control module 406 to wake from a first sleep mode. For instance, after a period of inactivity of the micromobility transit vehicle 400 (e.g., parked for a threshold period, no signal received from the dynamo 404, etc.) or based on a status of the micromobility transit vehicle 400 (e.g., ride ended by user or operator, detected threat or theft, etc.), the control module 406 may enter the first sleep mode to conserve battery power and/or limit use of the micromobility transit vehicle 400. In some embodiments, the first signal 502 may simply be the presence of power from the dynamo 404.

In some embodiments, the control module 406 may be configured to receive a signal 506 from an inertial measurement unit (IMU) 504 of the micromobility transit vehicle 400. In some embodiments, the signal 506 received from the IMU 504 may function as the first signal 502 to cause the control module 406 to wake from the first sleep mode. For instance, the control module 406 may be powered by its own onboard battery. Hence, the control module 406 may not be powered by the dynamo 404. In such embodiments, the IMU 504 may be used to detect motion of the micromobility transit vehicle 400 to signal the control module 406 to wake up the battery 408. In such embodiments, the control module 406 may monitor the IMU 504 and the voltage of the onboard battery and/or the battery 408 to cause the micromobility transit vehicle 400, or portions thereof, to enter a sleep mode (e.g., a battery-off state) as much as possible to conserve battery power.

In some embodiments, the signal 506 received from the IMU 504 may be used by the control module 406 to confirm the first wake-up command received from the dynamo 404. For instance, after receiving the first signal 502 from the dynamo 404, the control module 406 may confirm with the IMU 504 that the micromobility transit vehicle 400 is moving and/or not under threat. In some embodiments, the control module 406 may verify the first wake-up command with one or more additional sensors or modules of the micromobility transit vehicle 400, such as verifying the first wake-up command with a fleet management system/server. In some embodiments, the control module 406 may verify the first wake-up command with one or more proximity sensors configured to detect whether the micromobility transit vehicle 400 is leaving a docked location (e.g., docking station 300 of FIG. 3D).

Upon receiving the first signal 502 from the dynamo 404, the control module 406 may be configured to transmit a second signal 508, such as to the battery 408. For example, the control module 406 may transmit the second signal 508 via one or more wired or wireless communication protocols, such as via a communication bus. The control module 406 may analyze the first signal 502 and transmit the second signal 508 based on the analysis of the first signal 502. In this manner, the control module 406 may include a logic structure. For instance, the control module 406 may analyze the strength, quality, repetition, and/or other characteristic of the first signal 502. Once the analysis determines the first signal 502 meets a threshold requirement, the control module 406 may be triggered to transmit the second signal 508. In some embodiments, the control module 406 may transmit the second signal 508 irrespective of the characteristics of the first signal 502, such as immediately upon receiving the first signal 502. The second signal 508 may be a controller area network (CAN) signal.

As shown in FIG. 5, the battery 408 may be configured to receive the second signal 508 transmitted by the control module 406. The second signal 508 may cause the battery 408 to change from a first state to a second state. For instance, the second signal 508 may be a second wake-up command causing the battery 408 to wake from a second sleep mode. In this manner, the control module 406 may be configured to wake the battery 408 without a manual signal from the user or operator, which is required in some legacy systems, as noted above. In such embodiments, the first state may be the second sleep mode, and the second state may be an awake or active mode. Similar to the control module 406, after a period of inactivity of the micromobility transit vehicle 400 (e.g., parked for a threshold period, no signal received from the dynamo 404, etc.) or based on a status of the micromobility transit vehicle 400 (e.g., ride ended by user or operator, detected threat or theft, etc.), the battery 408 may enter the second sleep mode. For instance, the second sleep mode may limit discharge of the battery 408 to conserve battery power and/or limit use of the micromobility transit vehicle 400. Upon receiving the second signal 508 from the control module 406, the battery 408 may be allowed to discharge to propel the micromobility transit vehicle 400 and/or power other elements of the micromobility transit vehicle 400. Accordingly, the battery 408 may include a smart logic device to control discharge of the battery 408.

In some embodiments, the control module 406 may be configured to cause the micromobility transit vehicle 400 to enter a low-power mode to conserve battery power. For example, the control module 406 may cause the battery 408 to enter a battery-off state, such as any of the battery-off states mentioned above, based at least on a period of time without receiving the first signal from the dynamo 404. The period of time may be a predefined time period or may be dynamic based on one or more operating conditions of the micromobility transit vehicle 400. For example, if the micromobility transit vehicle 400 is stopped at a stop light or is otherwise located in an area with frequent, extended stops, the period of time before the control module 406 causes the battery 408 to enter a battery-off state may be prolonged.

Continuing to refer to FIG. 5, the system 500 may include other components or features. For example, micromobility transit vehicle 400 may include a propulsion system 510. In such embodiments, the battery 408 may provide electric power to the propulsion system 510 upon waking from the second sleep mode upon receipt of the second signal 508 from the control module 406. In this manner, the system 500 may provide a functional and intuitive method of powering/waking up the micromobility transit vehicle 400 from a sleep mode, simplifying and/or streamlining an activation stage of the micromobility transit vehicle 400 to improve the ride experience for the user or operator.

The propulsion system 510 may be similar to the propulsion system 122 described above. For instance, propulsion system 510 may be implemented as one or more motor-based propulsion systems, and/or other types of propulsion systems that can be used to provide motive force to the micromobility transit vehicle 400. In such embodiments, the propulsion system 510 may include an electric motor powered by the battery 408.

In some embodiments, the system 500 may include one or more accessories, modules, sensors, or features 520 (hereinafter "accessory features" for ease of reference without intent to limit) of the micromobility transit vehicle 400. In such embodiments, the dynamo 404 may provide electrical power to the one or more accessory features 520. For instance, the one or more accessory features 520 may include an anti-theft module 522, a tracking module 524, a communications module 526, a telemetry module 528, or any combination thereof. In some embodiments, the one or more accessory features 520 may include a headlight, a taillight, a light strip, an indicator light, an audible alarm, or any combination thereof. Depending on the application, the dynamo 404 may be used to power only the one or more accessory features 520 of the micromobility transit vehicle 400, with the control module 406 utilizing other power sources (e.g., separate onboard battery, etc.) and other signals (e.g., from the IMU 504) to signal when to wake up the battery 408.

The anti-theft module 522 may be configured to determine whether the micromobility transit vehicle 400 is being stolen or tampered with, such as through use of one or more sensors associated with the micromobility transit vehicle 400 (e.g., accelerometer, force sensors, etc.). When a threat is detected, the anti-theft module 522 may prevent use of the micromobility transit vehicle 400, such as via locking one or more wheels, preventing discharge of the battery 408, preventing battery replacement, locking the propulsion system 510, or the like. Because the anti-theft module 522 is powered, at least partially, by the dynamo 404, the anti-theft module 522 may function even if the battery 408 is fully discharged or removed, as long as the wheel 402 of the micromobility transit vehicle 400 is being rotated.

The tracking module 524 may include a GPS device or other tracking element operable to transmit a location of the micromobility transit vehicle 400. The tracking module 524 may assist in asset recovery operations. For example, the tracking module 524 may be used to locate the micromobility transit vehicle 400 when charging and/or other maintenance is required or in the case of theft or vandalism. Because the tracking module 524 is also powered, at least partially, by the dynamo 404, the tracking module 524 may function even if the battery 408 is fully discharged or removed, as long as the wheel 402 of the micromobility transit vehicle 400 is being rotated.

The communications module 526 may include one or more communication devices (e.g., Bluetooth device, Wi-Fi device, etc.) allowing the micromobility transit vehicle 400 to communicate with one or more users of a network, such as a fleet manager/service provider. In some embodiments, the communications module 526 may permit communications between vehicles. For example, the micromobility transit vehicle 400 may communicate, via the communications module 526, with other transit vehicles and/or with a station or beacon. For instance, the micromobility transit vehicle 400 may offload data to a fixed station (e.g., docking station 300 of FIG. 3D) via the communications module 526. The communications module 526 may function in conjunction with the anti-theft module 522 and/or the tracking module 524 to assist in asset recovery operations and/or alert a fleet servicer operator/server of detected threat or other status of the micromobility transit vehicle 400. Because the communications module 526 is also powered, at least partially, by the dynamo 404, the communications module 526 may function even if the battery 408 is fully discharged or removed, as long as the wheel 402 of the micromobility transit vehicle 400 is being rotated. The communications module 526 may be similar to the communications module 120 and/or the communications module 134 described above.

The telemetry module 528 may include one or more sensors operable to determine one or more dynamic characteristics of the micromobility transit vehicle 400. For example, the telemetry module 528 may determine the distance traveled, speed, inclination angle, local conditions, crash status, or any combination thereof of the micromobility transit vehicle 400. Depending on the application, the telemetry module 528 may include, or receive one or more signals from, the dynamo 404 and/or the IMU 504. For example, one or more signals received from the dynamo 404 may be used to determine the distance traveled and the speed of the micromobility transit vehicle 400. One or more signals received from the IMU 504 may be used for dead reckoning, hill detection, and/or crash detection. In some embodiments, the telemetry module 528 may include a pressure sensor for altitude estimation. Because the telemetry module 528 is also powered, at least partially, by the dynamo 404, the telemetry module 528 may function even if the battery 408 is fully discharged or removed, as long as the wheel 402 of the micromobility transit vehicle 400 is being rotated.

In some embodiments, the dynamo 404 may support a smart powertrain feature of the micromobility transit vehicle 400. For example, the dynamo 404 may provide a speed signal for a wheel that does not already a speed sensor built in. For instance, a speed of the micromobility transit vehicle 400 may be determined based on the frequency, level, and/or other characteristic of the signal and/or power generated by the dynamo 404. The dynamo 404 may support variable braking and/or variable propulsion of the micromobility transit vehicle 400 (e.g., the wheel 402) based on one or more sensed conditions of the micromobility transit vehicle 400. For instance, the smart powertrain may provide dynamic "boost" based on the speed signal received from the dynamo 404, whether alone or in combination with other sensors of the micromobility transit vehicle 400 (e.g., IMU signals, accelerometers, etc.).

In some embodiments, the dynamo 404 may support a smart maintenance feature of the micromobility transit vehicle 400. For instance, the signal and/or power generated by the dynamo 404 may be analyzed, whether alone or in combination with other sensors of the micromobility transit vehicle 400 (e.g., accelerometers, IMU, etc.), to determine miles traveled, detect abnormal power and/or braking events, detect crashes, or detect threats, among others. Such information may be used to generate a predictive maintenance schedule tailored to the conditions of the micromobility transit vehicle 400. Such information may be used to generate a ride profile of the micromobility transit vehicle 400. The ride profile may include information related to miles traveled, battery degradation, use history, use type, etc. In some embodiments, triggering events (e.g., detected crashes, threats, etc.) may be sent to a fleet manager to indicate that service or asset recovery operations is recommended.

The system 500 may be implemented using hardware, software, or combinations of hardware and software. For example, the system 500 may include a non-transitory medium storing instructions, and one or more hardware processors operable to execute the instructions stored on the non-transitory medium to cause the system 500 to perform operations. As described herein, the operations include detecting a movement of the wheel 402; determining whether the movement exceeds a threshold movement; based on determining the movement exceeds the threshold movement, transmitting a signal to the battery 408; and based on receiving the signal, causing the battery 408 to wake from a sleep mode. In some embodiments, the operations include transmitting a second signal from the dynamo 404 to the control module 406 prior to transmitting the signal to the battery 408 and based on determining the movement exceeds the threshold movement.

In some embodiments, the system 500 may be implemented on one or more legacy transportation systems, such as retrofitted to one or more legacy micromobility transit vehicles that have or do not have a battery (hereinafter "legacy vehicle"). For example, the dynamo 404 may be attached to, coupled with, or otherwise associated with a wheel of a legacy vehicle such that movement of the wheel activates the dynamo 404. In some embodiments, the dynamo 404 may be connected to an existing wheel of a legacy it vehicle. In some embodiments, an existing wheel of the legacy vehicle may be replaced with a new wheel, such as wheel 402, that includes dynamo 404 as part of the wheel. In some embodiments, the existing wheel of the legacy vehicle may be disassembled and the dynamo 404 added to the existing wheel, such as defining a new hub of the existing wheel.

In these and other embodiments, the dynamo cables 430 of the control module 406 may be routed at least partially through the front fork 432 of the legacy vehicle and connected to the dynamo 404. The control cables 440 of the control module 406 may also be routed to an existing battery of the legacy vehicle to provide the wake or activation feature described herein. In embodiments without a battery, the control cables 440 may be routed to one or more other portions of the legacy vehicle controllable by the control module 406, such as to user interface 113, to wake or activate the one or more other portions of the legacy vehicle based on motion of the wheel.

FIG. 6A illustrates a perspective view of the control module 406 in accordance with an embodiment of the disclosure. FIG. 6B illustrates another perspective view of the control module 406 with a housing removed for illustrations purposes in accordance with an embodiment of the disclosure. As shown, the control module 406 may include a plurality of components, modules, or assemblies assembled together as a unit. For example, the control module 406 may include a two-piece housing 600 with a base 602 and a lid 604, the housing 600 defining an interior compartment 606. The housing 600 may be plastic, and the lid 604 may be sealed to the base 602 to seal the interior compartment 606 from dirt, fluid, and other debris. In some embodiments, the housing 600 may be a commercial off the shelf enclosure. The control module 406 may include a printed circuit board (PCB) 610 or other logic board with one or more chipsets, processors, transistors, or other electronics, or any combination thereof. The dynamo cables 430 may be connected to one side of the PCB 610, and the control cables 440 may be connected to another side of the PCB 610, such as to an opposing side of the PCB 610.

In some embodiments, the control module 406 may include a first controller 620 configured to receive the first signal 502 based on a dynamic characteristic of the micromobility transit vehicle 400. For example, as explained above, the dynamic characteristic may be a movement of the wheel 402 of the micromobility transit vehicle 400 beyond a threshold movement. The control module 406 may include a second controller 622 configured to transmit the second signal 508 to the battery 408 based at least on a receipt of the first signal 502 by the first controller 620. As noted above, the second signal 508 may cause the battery 408 to change from a first state to a second state. For instance, the first state may be a sleep mode of the battery 408 limiting discharge of the battery 408. The second state may be an awake or active mode of the battery 408 permitting discharge of the battery 408. The first controller 620 and second controller 622 may include one or more hardware processors (e.g., MCUs, chipsets, or other logic device) operable to execute instructions stored on a non-transitory medium. Depending on the application, the first controller 620 and the second controller 622 may be a single integrated controller or circuit with separate logic structures or a single logic structure.

Figure 7:
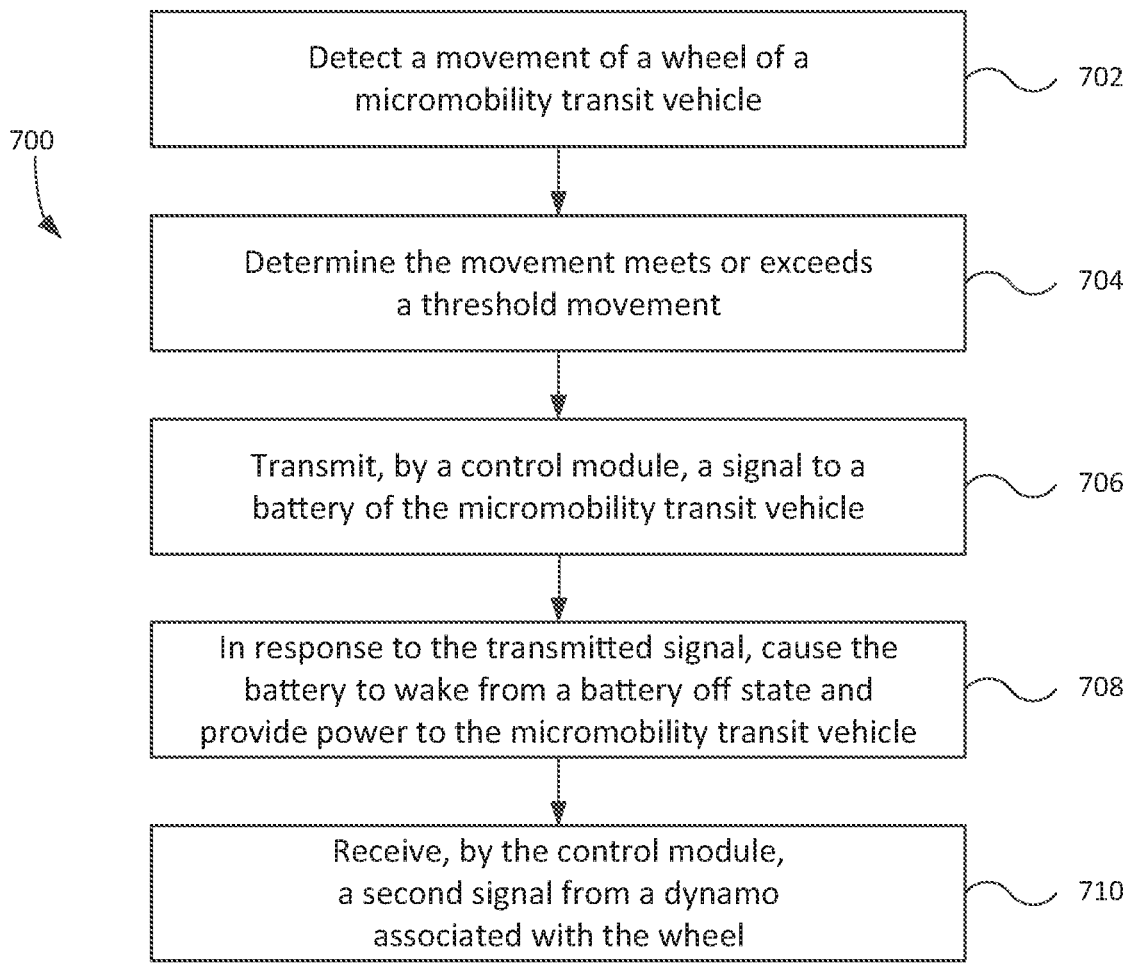
FIG. 7 illustrates a flow diagram of a process of waking a battery from a battery-off state to a battery-on state based on detected movement of a wheel of a micromobility transit vehicle in accordance with an embodiment of the disclosure.

FIG. 7 illustrates a flow diagram of a process 700 of waking a battery from a battery-off state based on detected movement of a wheel of a micromobility transit vehicle in accordance with an embodiment of the disclosure. It should be appreciated that any step, sub-step, sub-process, or block of process 700 may be performed in an order or arrangement different from the embodiments illustrated by FIG. 7. For example, one or more blocks may be omitted from or added to the process 700. Although process 700 is described with reference to the embodiments of FIGS. 1-6, process 700 may be applied to other embodiments.

In Block 702, process 700 includes detecting a movement of a wheel of a micromobility transit vehicle. For instance, a movement of the wheel 402 of micromobility transit vehicle 400 may be detected via the dynamo 404 and/or the control module 406, such as explained above. In some embodiments, the presence of power from the dynamo 404 may indicate movement of the wheel 402. In Block 704, process 700 includes determining the movement meets or exceeds a threshold movement. For instance, Block 704 may include determining whether the wheel 402 rotates a predetermined threshold amount (such as through a minimum rotational degree of the wheel 402) or travels a predetermined threshold distance (such as a minimum distance traveled by the wheel 402 along a surface), as explained above.

In Block 706, process 700 includes transmitting a signal to a battery of the micromobility transit vehicle. For example, the control module 406 may transmit a signal to the battery 408 once movement of the wheel 402 meets or exceeds the threshold movement, as described above. Depending on the application, the signal may be transmitted wirelessly or over a wired connection between the control module 406 and the battery 408. In Block 708, process 700 includes causing the battery to wake from a battery-off state and provide power to the micromobility transit vehicle in response to receiving the signal. For example, the signal may be a wake-up command causing the battery 408 to change from a sleep mode to an awake or active mode. The sleep mode of the battery 408 may limit discharge of the battery 408, such as to conserve battery power and/or limit use of the micromobility transit vehicle 400. The awake or active mode of the battery 408 may permit discharge of the battery 408 to propel the micromobility transit vehicle 400 and/or power other accessories or features of the micromobility transit vehicle 400.

In Block 710, process 700 may include receiving a second signal from a dynamo associated with the wheel and communicatively coupled to a control module. In such embodiments, the detecting of movement of the wheel may be by the control module 406. The transmitting of the signal to the battery may be by the control module 406 in response to receiving the second signal from the dynamo 404. For instance, the second signal from the dynamo 404 may be the first signal 502 described above. The signal transmitted to the battery may be the second signal 508 described above. The dynamo may be similar to the dynamo 404 described above. The control module may be similar to the control module 406 described above.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A multimodal transportation system, comprising:
one or more micromobility transit vehicles, wherein each of the one or more micromobility transit vehicles comprises:
an electric battery configured to receive a manual signal that wakes the electric battery from a battery-off state to a battery-on state;
a dynamo configured to detect one or more movements of a wheel that satisfies a threshold movement and generate a dynamo signal, wherein the dynamo is further configured to convert a mechanical power associated with the one or more movements of the wheel into an electrical power to generate the dynamo signal, and wherein the threshold movement comprises a predetermined nonzero degree of rotation of the wheel; and
a control module coupled to the dynamo, wherein the control module is configured to receive the dynamo signal from the dynamo and wake the electric battery from the battery-off state to the battery-on state without the electric battery receiving the manual signal.

2. The multimodal transportation system of claim 1, wherein each of the one or more micromobility transit vehicles comprises an electric motor, wherein upon waking the electric battery from the battery-off state to the battery-on state, the electric battery provides electric power to the electric motor.

3. The multimodal transportation system of claim 1, wherein:
each of the one or more micromobility transit vehicles comprises:

a communication bus, wherein the dynamo is configured to transmit the dynamo signal to the communication bus and the control module is configured to receive the dynamo signal over the communication bus; and
a fork supporting a wheel comprising the dynamo;
the communication bus is positioned from the control module through the fork to the dynamo; and
the dynamo is integrated into a hub of the wheel to detect the one or more movements of the wheel that satisfies the threshold movement.

4. The multimodal transportation system of claim 1, wherein at least some of the one or more micromobility transit vehicles each comprises a storage basket mounted above a wheel comprising the dynamo, and wherein the control module is located within a sealed enclosure underneath the storage basket.

5. The multimodal transportation system of claim 1, wherein:
each of the one or more micromobility transit vehicles further comprises one or more accessory features; and
the dynamo provides electrical power to the one or more accessory features.

6. The multimodal transportation system of claim 5, wherein the one or more accessory features of each of the one or more micromobility transit vehicles comprise:
an anti-theft module limiting use of the one or more micromobility transit vehicles upon detection of a threat to the one or more micromobility transit vehicles;
a tracking module configured to transmit a location of the one or more micromobility transit vehicles;
a communications module comprising one or more communication devices facilitating communication between the one or more micromobility transit vehicles; or
a telemetry module configured to determine at least one of a distance traveled, a speed, an inclination angle, one or more local conditions, ora crash status of the one or more micromobility transit vehicles.

7. The multimodal transportation system of claim 1, wherein the dynamo provides a speed signal supporting a smart powertrain feature of each of the one or more micromobility transit vehicles, and wherein the smart powertrain feature comprises variable braking or variable propulsion of a wheel based on one or more sensed conditions of each of the one or more micromobility transit vehicles.

8. The multimodal transportation system of claim 1, wherein the control module causes the electric battery to enter the battery-off state based at least on a period of time without receiving the first signal from the dynamo.

9. The multimodal transportation system of claim 1, wherein the one or more micromobility transit vehicles comprise one or more bicycles.

10. A control module for a micromobility transit vehicle and configured to wake an electric battery of the micromobility transit vehicle from a battery-off state to a battery-on state based on one or more sensed dynamic characteristics of at least one wheel of the micromobility transit vehicle that satisfy a threshold, the control module comprising:
a first controller configured to receive a first signal based on the one or more sensed dynamic characteristics of the micromobility transit vehicle that satisfy the threshold, wherein the threshold comprises a predetermined nonzero degree of rotation of the at least one wheel of the micromobility transit vehicle; and
a second controller configured to transmit a second signal to the electric battery based at least on a receipt of the first signal from the first controller, wherein the second signal causes the electric battery to change from the battery-off state to the battery-on state.

11. The control module of claim 10, wherein:
the first signal is a first wake-up command causing the control module to wake from a first sleep mode;
the battery-off state is a second sleep mode of the electric battery; and
the battery-on state is an active mode of the electric battery.

12. The control module of claim 10, wherein the one or more dynamic characteristics comprises a movement of the at least one wheel of the micromobility transit vehicle that satisfies the threshold.

13. The control module of claim 10, wherein the first signal is received from an inertial measurement unit of the micromobility transit vehicle.

14. The control module of claim 10, wherein the second signal is a controller area network signal.

15. The control module of claim 10, wherein the control module causes the electric battery to change from the battery-on state to the battery-off state based at least on a period of time without receiving the first signal.

16. A system for a micromobility transit vehicle, the system comprising:
a non-transitory medium storing instructions; and
one or more hardware processors operable to execute the instructions to cause the system to perform operations comprising:
detecting a movement of a wheel;
determining whether the movement of the wheel satisfies a threshold movement, wherein the threshold movement comprises a predetermined nonzero degree of rotation of the wheel;
based on determining that the movement of the wheel satisfies the threshold movement, generating an electric power signal by converting a mechanical power associated with the detected movement of the wheel;
transmitting the electric power signal to a battery of the micromobility transit vehicle; and
based on the electric power signal, causing the battery to wake from a battery-off state to a battery-on state.

17. The system of claim 16, further comprising:
a dynamo associated with the wheel; and
a control module, wherein the operations further comprise transmitting a second signal from the dynamo to the control module prior to transmitting the signal to the battery and based on determining that the movement of the wheel satisfies the threshold movement.

18. The system of claim 17, wherein the control module is configured to transmit the signal to the battery to wake the battery from a sleep mode.

19. A method comprising:
detecting a movement of a wheel of a micromobility transit vehicle;
determining whether the movement of the wheel satisfies a threshold movement, wherein the threshold movement comprises a predetermined nonzero degree of rotation of the wheel;
in response to determining that the movement of the wheel satisfies the threshold movement, generating an electric power signal by converting a mechanical power associated with the detected movement of the wheel;
transmitting the electric power signal to a battery of the micromobility transit vehicle; and in response to transmitting the electric power signal to the battery, causing the battery to wake from a battery-off state and provide power to the micromobility transit vehicle.

20. The method of claim 19, further comprising receiving a second signal from a dynamo associated with the wheel and communicatively coupled to a control module, wherein the movement of the wheel is detected is by the control module, and wherein the electric power signal is transmitted is by the control module in response to receiving the second signal from the dynamo.

* * * * *